United States Patent [19]

Clendening et al.

[11] Patent Number: 5,325,380
[45] Date of Patent: Jun. 28, 1994

[54] DUAL WAVELENGTH LASER EMITTER

[75] Inventors: Charles W. Clendening, Torrance; Hagop Injeyan; Jacqueline G. Berg, both of Glendale; Gerald W. Holleman, Manhattan Beach, all of Calif.

[73] Assignee: TRW Inc., Redondo Beach, Calif.

[21] Appl. No.: 916,771

[22] Filed: Jul. 17, 1992

[51] Int. Cl.$^5$ .............................................. H01S 3/10
[52] U.S. Cl. ........................................ 372/23; 372/21; 372/22
[58] Field of Search ............................... 372/21, 22, 23

[56] References Cited

U.S. PATENT DOCUMENTS

| | | | |
|---|---|---|---|
| 4,866,720 | 9/1989 | Holly | 372/23 |
| 5,111,334 | 5/1992 | Heidemann | 359/341 |
| 5,134,624 | 7/1992 | Ono | 372/32 |
| 5,144,630 | 9/1992 | Lin | 372/22 |

OTHER PUBLICATIONS

Dual Longitudinal Mode Nd: YAG Laser by T. D. Raymond, A. V. Smith and P. Esherick-Submitted to the 1992 Advanced Solid State Laser Conference (4 pages) (month not available).

Primary Examiner—Frank Gonzalez
Attorney, Agent, or Firm—Sol L. Goldstein

[57] ABSTRACT

A dual-wavelength laser emitter is provided for emitting a dual-wavelength laser beam. The laser emitter includes a first laser beam source for generating a first laser beam having a first frequency and a second laser beam source for generating a second laser beam having a second frequency. A beam splitter is included for combining portions of the first and second laser beams to form a dual-wavelength laser beam. The dual-wavelength laser beam is then amplified via an amplifier. A stimulated Brillouin scattering cell may be included to phase conjugate the dual-wavelength laser beam to improve the quality of the output beam. A frequency-doubling crystal may further be included for doubling the frequency of the dual-wavelength laser beam. The dual-wavelength laser emitter then emits a laser output beam as a function of the frequencies and amplitudes of the first and second laser beams.

18 Claims, 2 Drawing Sheets

DUAL WAVELENGTH LASER EMITTER

BACKGROUND OF THE INVENTION

Technical Field

This invention relates to laser systems and, more particularly, to laser emitters with dual-wavelength laser emission capabilities.

Discussion

Laser emission systems are generally employed for generating and emitting laser beams. Traditional laser emitters have generated single laser beams having a single frequency signal. These traditional single laser beams have generally been employed for detection and communication applications. However, single frequency laser emissions are somewhat limited in applications as a need for more complex laser emissions has developed.

More complex laser emitters have been developed for generating dual-wavelength laser emissions. The conventional dual-wavelength laser emitter typically employs two separate laser systems. Each of the two separate laser systems generally require separate laser sources, amplifiers and frequency doublers for generating separate amplified laser beams. The two amplified laser beams are then split and portions thereof are combined to form a dual-wavelength laser emission.

The conventional dual-wavelength laser emission approach is relatively large and complex. In addition, the conventional approach generally employs a beam splitter for splitting and combining portions of the separate laser beams subsequent to undergoing the amplification. In doing so, the beam splitter usually reflects and combines approximately half the total energy input thereto. The remaining portions of the separate laser beams are generally lost by transmission which thereby results in energy loss. Since the separate laser beams have been fully amplified and thereby contain a substantial amount of the total laser beam energy, the beam splitter generally loses a large amount of the total laser beam energy. This results in a large loss in total laser beam energy and leads to an inefficient laser emission. This large energy loss is undesirable and generally non-tolerable for spaceborne applications and the like.

It is therefore desirable to provide for a smaller, less complex and more efficient dual-wavelength laser emitter. In particular, it is desirable to provide for a dual-wavelength laser emitter which is substantially made up of a single more integrated laser emission system which does not require dual components, such as two separate amplifiers and two separate frequency doublers which are generally found on the conventional laser systems. In addition, it is further desirable to provide for a more efficient laser emitter which does not suffer large losses in total laser beam energy as conventional laser emitters have.

SUMMARY OF THE INVENTION

In accordance with the teachings of the present invention, a dual-wavelength laser emitter is provided. The laser emitter has a first laser source for generating a first laser beam with a first frequency and a second laser source for generating a second laser beam with a second frequency. A beam combiner is provided for combining the first and second laser beams to form a dual-wavelength laser beam. An amplifier is connected to the output of the beam combiner for amplifying the dual-wavelength laser beam. The laser emitter may further include a frequency-doubler for doubling the frequency of the dual-wavelength laser beam. The dual-wavelength laser beam is output as a function of the frequencies of the first and second laser beams.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENT

Figure 1:
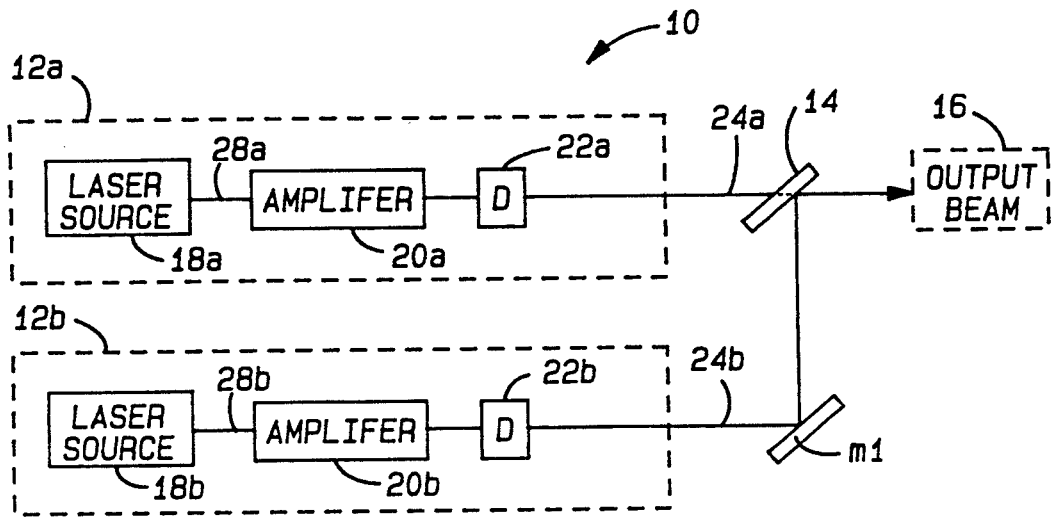
FIG. 1 is a block diagram which illustrates a conventional dual-wavelength laser emitter in accordance with the prior art.

A conventional dual-wavelength laser emitter 10 is shown in FIG. 1 in accordance with the prior art. The conventional dual-wavelength laser emitter 10 includes a first laser source 18a for generating a first laser beam 28a. The first laser source 18a has an output connected to a first amplifier 20a for amplifying the first laser beam 28a. The output of the first amplifier 20a is connected to a first frequency doubler (D) 22a which receives the amplified first laser beam 28a and provides frequency doubling thereof. The first laser source 18a, first amplifier 20a and first frequency doubler 22a make up a first laser system 12a for generating an amplified frequency doubled first laser beam 24a.

The conventional dual-wavelength laser emitter 10 includes a second laser system 12b for generating an amplified frequency doubled second laser beam 24b. The second laser system 12b likewise includes a second laser source 18b for generating a second laser beam 28b. The second laser system 12b further includes a second amplifier 20b connected to the output of the second laser source 18b. In addition, the second laser system 12b includes a second frequency doubler (D) 22b connected to the output of the second amplifier 20b.

The amplified frequency doubled first laser beam 24a is then provided as an input to a beam splitter 14. The amplified frequency doubled second laser beam 24b is also provided as an input to the beam splitter 14 via reflection from a mirror M1. As such, each of the amplified frequency doubled first and second laser beams 24a and 24b are split and portions thereof are combined to form a single dual-wavelength laser output beam 16 which is emitted therefrom.

The conventional dual-wavelength laser emitter 10 employs two laser system 12a and 12b, each of which unduly requires separate amplifiers 20a and 20b and separate frequency doublers 22a and 22b. This results in a somewhat large and rather complex dual-wavelength laser emitter 10. As a consequence, the laser emitter 10 is heavy and somewhat expensive.

In addition, the conventional dual-wavelength laser emitter 10 employs a beam splitter 14 for combining portions of the first and second laser beams 24a and 24b after each laser beam has been amplified to desired operating amplitudes. The beam splitter 14 is a beam combiner which splits each of the first and second laser beams 24a and 24b and combines a portion of each laser beam to produce the dual-wavelength laser output beam 16. However, a large portion of each of the first and second laser beams 24a and 24b is lost by the beam splitter 14 and therefore results in energy loss. Conventional beam splitters which have been employed for such purposes generally reflect and transmit approximately half of the input laser beams which typically results in approximately a fifty percent loss in energy efficiency. As a result, a substantial amount of the total laser beam energy generated by the conventional laser emitter 10 is lost by reflection of first laser beam 24a and transmission of second laser beam 24b. The beam splitter 14 thereby suffers from approximately a fifty percent loss in total laser beam energy which thereby results in an inefficient conventional dual-wavelength laser emitter 10.

Figure 2:
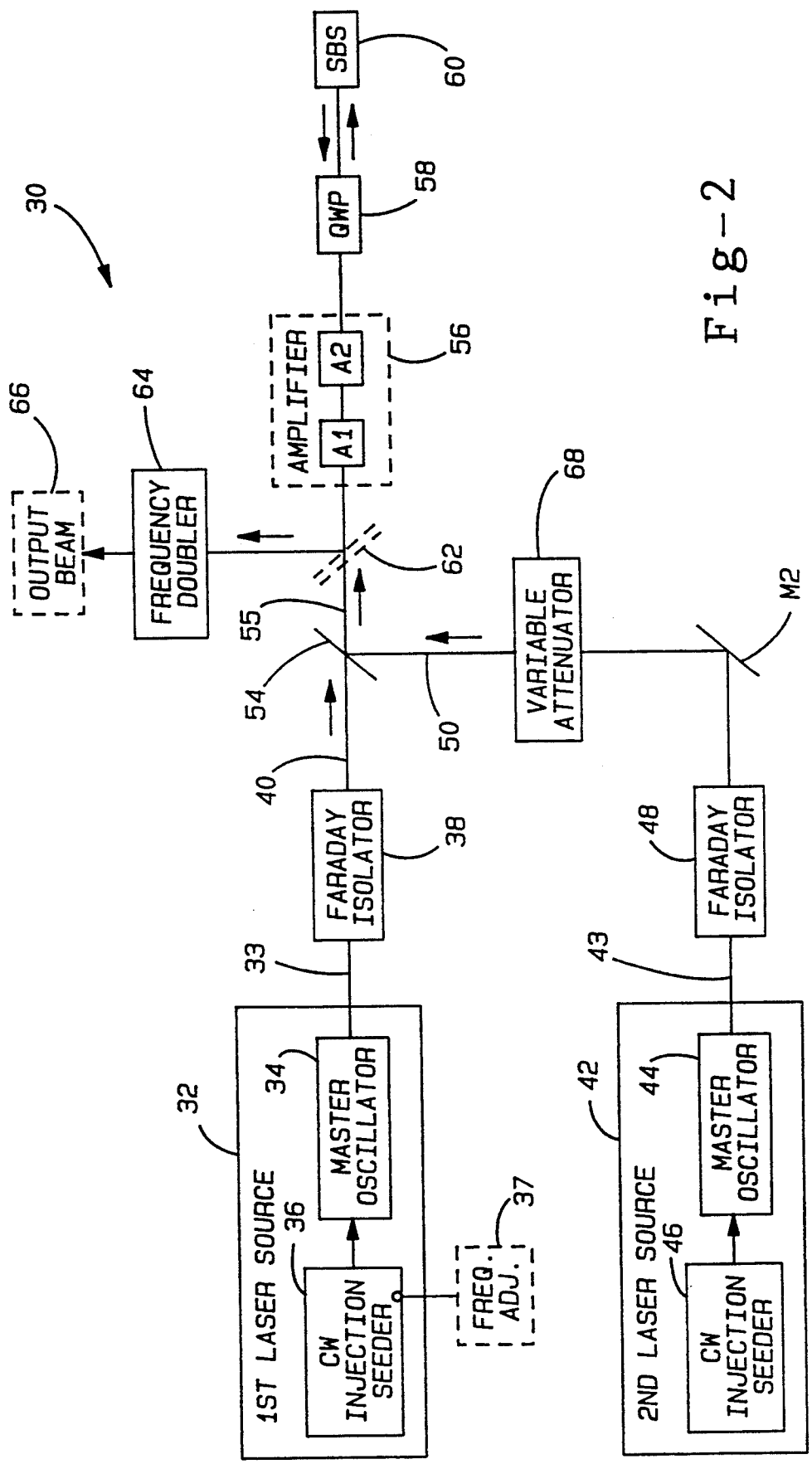
FIG. 2 is a block diagram which illustrates a dual-wavelength laser emitter in accordance with the present invention.

Turning now to FIG. 2, a dual-wavelength laser emitter 30 is shown therein in accordance with the present invention. The laser emitter 30 as provided in the present invention is a smaller, less complex and more integrated dual-wavelength laser emitter 30 which does not require two separate amplifiers and frequency doublers as shown in the prior art. In addition, the present invention does not suffer from the large total energy loss that is generally found in the prior art.

The dual-wavelength laser emitter 30 employs a first laser source 32 for generating a first laser beam 33. The first laser source 32 includes a first master oscillator 34 which is connected to a first continuous wave (CW) injection seeder 36. The CW injection seeder 36 provides a continuous wave signal to the first master oscillator 34 to control the frequency $f_1$ and therefore the wavelengths of the first laser beam 33. In response, the first master oscillator 34 produces the first laser beam 33 having a preset amplitude and a first frequency $f_1$. A frequency adjustment 37 is further provided as an input to the CW injection seeder 36 for adjusting the first frequency $f_1$.

Figure 3:
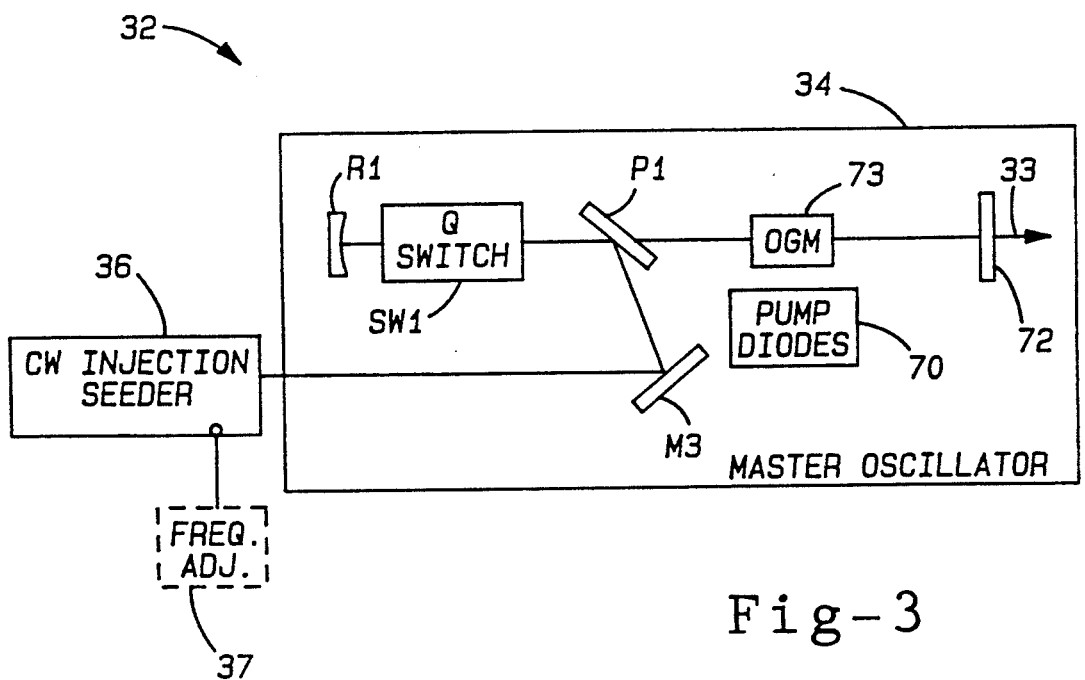
FIG. 3 is a block diagram which illustrates a laser source that may be used in the present invention.

The preferred embodiment of the first laser source 32 is illustrated in more detail in FIG. 3. The first master oscillator 34 accordingly receives a continuous wave (CW) signal from the CW injection seeder 36. A mirror M3 receives the CW signal and reflects the CW signal to a polarizer P1. The polarizer P1 reflects the CW signal to a Pockels cell Q switch SW1 which allows for transmission therethrough upon receiving a sufficient energy gain build-up. The Q switch SW1 then transmits a signal to a reflector R1 for total reflection therefrom. As such, the CW signal is transmitted through the Q switch SW1 in the opposite direction and thereafter passes through the polarizer P1 to an oscillator gain medium (OGM) 73. The oscillator gain medium 73 generates a lasing signal which is output to an outcoupler 72 for transmission of the first laser beam 33. Pump diodes 70 are optically coupled to the oscillator gain medium 73 which radiate light thereto to excite the oscillator gain medium 73 which thereby produces the lasing action.

The dual-wavelength laser emitter 30 includes a second laser source 42. The second laser source 42 likewise includes a second master oscillator 44 connected to a continuous wave (CW) injection seeder 46. The second laser source 42 is preferably the same kind as the first laser source 32 shown in FIG. 3. The second laser source 42 generates a second laser beam 43 with a second frequency $f_2$. The second laser source 42 may include a frequency adjustment (not shown) if desired for adjusting the second frequency $f_2$. The first and second laser beams 33 and 43 have separate frequencies $f_1$ and $f_2$ and therefore separate wavelengths which allow for the formation of a dual-wavelength laser beam. The amplitude of the second laser beam 43 may be equal to or different than the amplitude of the first laser beam 33 depending on the desired applications.

A first Faraday isolator 38 is coupled to the output of the first laser source 32 for providing isolation between the first laser source 32 and other components of the laser emitter 30. The first Faraday isolator 38 allows the first laser beam 33 to pass therethrough and be output as first laser beam 40. Likewise, a second Faraday isolator 48 is connected to the output of the second laser source 42 for providing isolation between the second laser source 42 and other components of the laser emitter 30. The second laser beam 43 is reflected from a mirror M2 and applied to a variable attenuator 68. The variable attenuator 68 may include a polarizer or other device for attenuating the amplitude of the second laser beam 43 to provide an attenuated second laser beam 50. As a result, the relative amplitude difference between the first and second laser beams 40 and 50 may be controlled by attenuating the amplitude of the second laser beam 50 via variable attenuator 68.

The output of the first Faraday isolator 38 is provided as an input to a beam splitter 54 which essentially is a beam combiner. The output of the variable attenuator 68 is also provided as an input to the beam splitter 54. As such, the beam splitter 54 receives the first laser beam 40 and the second laser beam 50 as inputs and produces as an output a co-propagating dual-wavelength laser beam 55. In doing so, the beam splitter 54 splits each of the first and second laser beams 40 and 50 into portions thereof. The beam splitter 54 then combines a portion of each of laser beams 40 and 50 together to form the dual-wavelength laser beam 55 as an output.

Conventional beam splitters such as the one employed herein generally allow approximately half of the total input beams to be transmitted to the output. The remaining portions of the input beams are usually lost. For instance, a portion of the first laser beam 40 is transmitted through the beam splitter 54 to form a portion of the dual-wavelength laser beam 55, while the remaining portion is reflected therefrom and lost. In contrast, a portion of the second laser beam 50 is reflected from the beam splitter 54 to form another portion of the dual-wavelength laser beam 55, while the remaining portion is transmitted therethrough and lost. In any event, the laser emitter 30 will generally lose approximately half the laser beam energy that is applied as an input to the beam splitter 54. As a result, the beam splitter 54 causes approximately a fifty percent energy loss when combining first and second laser beams 40 and 50 to form the dual-wavelength laser beam 55.

The beam splitter 54 preferably apportions and combines approximately half of each of the first and second laser beams 40 and 50. However, the apportionment may be adjusted to accommodate for different amplitudes in beam strength for the first and second laser beams 40 and 50. For example, the beam splitter 54 may be used to combine ninety percent of the first laser beam 40 with ten percent of the second laser beam 50, thereby downsizing the amplitude of the second laser beam 50. An apportionment such as this may allow for a limited increase in energy efficiency by combining a greater portion of the laser beam which has a larger amplitude.

The output of the beam splitter 54 is transmitted through a polarization outcoupler 62 to an amplifier 56. The amplifier 56 shown herein is a two-stage amplifier which has a first amplifier stage A1 and a second amplifier stage A2 for amplifying the dual-wavelength laser beam 55 to a desired operating amplitude. While a two-stage amplifier is shown, the invention could employ any single or multiple stage amplifier as desired.

The amplifier 56 is coupled to a quarter-wave plate (QWP) 58. The quarter-wave plate 58 begins a ninety-degree rotation of the polarization of the amplified dual-wavelength laser beam that will be completed on the return pass. The quarter-wave plate 58 is further coupled to a stimulated Brillouin scattering (SBS) cell 60.

The stimulated Brillouin scattering cell 60 provides phase conjugation to the dual-wavelength laser beam so as to generate an optical phase-conjugate reflection. In doing so, the stimulated Brillouin scattering cell 60 serves to improve the quality of the output beam by repairing imperfections found therein. When the dual-wavelength laser beam is applied to the stimulated Brillouin scattering cell 60, the situation is similar to using a broad band or multi-mode beam. Under these circumstances high fidelity phase conjugation can generally be achieved only if the interaction length of the stimulated Brillouin scattering cell 60 is smaller than the coherence length associated with the broad band beam or in this case the coherence length associated with the frequency separation between the two wavelengths. Near the threshold of the stimulated Brillouin scattering cell 60, the interaction length is relatively well defined and corresponds to approximately three times the beam depth of focus. At energies many times the threshold, the grating migration of the stimulated Brillouin scattering cell 60 increases the effective interaction length and fidelity can suffer unless the coherence length can accommodate the effective interaction length.

Alternately, the medium used in the stimulated Brillouin scattering cell 60 can be reduced to match the coherence length. As such, the grating migration will not be an issue. As an example, if the two wavelengths are separated by one GHz and the associated coherence length is 30 cm, as long as the depth of the focus is less than approximately 30 cm or the stimulated Brillouin scattering cell is less than 30 cm long, good conjugation fidelity can generally be achieved.

The dual-wavelength laser beam is further reflected from the stimulated Brillouin scattering cell 60 back through the quarter-wave plate 58 and amplifier 56. As such, the quarter-wave plate 58 completes a ninety degree rotation of the polarization of the dual-wavelength laser beam. In addition, the laser beam is further amplified by amplifier 56 to obtain the desired operating amplitude. The dual-wavelength laser beam is then applied to the polarization outcoupler (PO) 62. The polarization outcoupler 62 reacts to the ninety degree rotation of the polarization on the dual-wavelength laser beam and reflects the polarization rotated dual-wavelength laser beam to a frequency-doubler 64.

If for some reason the polarization of the dual-wavelength laser beam is not fully rotated to ninety degrees, the unrotated portion of the laser beam will pass through the polarization outcoupler 62 and beam splitter 54 to the Faraday isolators 38 and 48. The Faraday isolator 38 and 48 will thereby prevent the transmission of such signals to the laser sources 32 and 42.

The frequency-doubler 64 is a crystal which doubles the frequency of the dual-wavelength laser beam. By doubling the frequency of the dual-wavelength laser beam, the laser emitter 10 is able to emit a laser beam which has wavelengths dependent upon the first laser beam 40, the second laser beam 50 and the intermediate beat frequency. As such, the frequency doubled dual-wavelength laser beam will contain frequencies twice the first and second frequencies $f_1$ and $f_2$ and twice the average of the two frequencies which produces an intermediate beat frequency. The resulting laser beam is then emitted as a laser output beam 66.

In operation, the dual-wavelength laser emitter 30 produces first and second laser beams 40 and 50 by way of the first and second laser sources 32 and 42, respectively. The first and second laser beams 40 and 50 have respective frequencies $f_1$ and $f_2$ and amplitudes which may be varied relative to each other and adjusted over a wide amplitude range. The first and second frequencies $f_1$ and $f_2$ are tuned relative to each other and are generally set within bandwidth limitations such as the operating bandwidth of the amplifier 56. The first and second laser beams 40 and 50 are each split and combined by way of the beam splitter 54. As a result, portions of each of the first and second laser beams 40 and 50 are combined to form a dual-wavelength laser beam 55.

The dual-wavelength laser beam 55 is amplified by amplifier 56. The amplified dual-wavelength laser beam is applied to the quarter-wave plate 58 and is further applied to the stimulated Brillouin scattering cell 60. The quarter-wave plate 58 begins a ninety-degree rotation of the polarization of the amplified dual-wavelength laser beam that will be completed on the return pass. The stimulated Brillouin scattering cell 60 provides phase conjugation and reflects the dual-wavelength laser beam back through the quarter-wave plate 58 where the ninety-degree rotation of the polarization on the dual-wavelength beam is completed. The polarization rotated dual-wavelength beam is further amplified by amplifier 56 and transmitted to polarization outcoupler 62. The polarization outcoupler 62 reflects the ninety degree polarized dual-wavelength laser beam to the frequency doubler 64. The frequency doubler 64 doubles the frequency of the dual-wavelength laser beam and thereby provides for laser beam emissions as a function of the first and second input frequencies $f_1$ and $f_2$.

The laser output beam 66 will generally include a laser beam having twice the frequency $f_1$ of the first laser beam 40. Likewise, the laser output beam 66 will include a laser beam having twice the frequency $f_2$ of the second laser beam 50. The laser output beam 66 will further include the average energy or intermediate beat frequency which is essentially the average of twice the first and second frequencies $f_1$ and $f_2$. The relative amplitudes of laser output beam 66 at the three frequencies $2f_1$, $2f_2$, and $2(f_1+f_2)$ can be adjusted with variable attenuator 68. As such, the dual-wavelength laser emitter 30 may be used for applications such as a remote sensing radar amongst other possible applications.

For example, the laser emitter 30 could be used to remotely sense the chemical makeup on the surface of a body of water or other material for purposes of detecting contamination or whatever. In doing so, two very close frequencies which generally vary by a few angstroms are emitted from the laser emitter 30. One of the frequencies is within the absorption band of the contaminant while the other frequency is outside of the absorption band. The two frequencies are emitted together and received together and the relative amplitude of the two will indicate whether contamination is detected. It should therefore be appreciated that an operator is able to obtain additional information by emitting a dual-wavelength signal and comparing the amplitudes received therefrom. Depending on the application, the frequencies may be tuned relative to each other in addition to controlling the relative amplitude to perform various applications.

In view of the foregoing, it can be appreciated that the present invention enables the user to achieve a more simplified and efficient dual-wavelength laser emitter. Thus, while this invention has been disclosed herein in connection with a particular example thereof, no limitation is intended thereby except as defined by the following claims. This is because a skilled practitioner will recognize that other modifications can be made without departing from the spirit of this invention after studying the specification and drawings.

We claim:

1. A dual-frequency laser emitter comprising:
   first laser source means for generating a first laser beam having a first frequency;
   second laser source means for generating a second laser beam having a second frequency;
   beam combining means for combining said first and second laser beams to form a dual-frequency laser beam, said beam combining means having an output for emitting said dual-frequency laser beam;
   amplification means coupled to the output of said beam combining means for receiving the dual-frequency laser beam and providing amplification thereof; and
   output means for transmitting said dual-frequency laser beam therefrom as a function of the frequencies of said first and second laser beams.

2. The laser emitter as defined in claim 1 further comprising;
   frequency-doubling means coupled to said output means for doubling the first and second frequencies of said dual-frequency laser beam.

3. The laser emitter as defined in claim 1 further comprising means coupled to said amplification means for providing phase conjugation to said dual-frequency laser beam.

4. The laser emitter as defined in claim 1 further comprising a variable attenuator means coupled to at least one of said first and second laser beams for adjusting the relative amplitude of said first and second laser beams.

5. The laser emitter as defined in claim 1 wherein said first and second laser source means each comprises:
   a master oscillator; and
   a continuous wave (CW) oscillator connected to said master oscillator.

6. The laser emitter as defined in claim 1 wherein said beam combining means comprises a beam splitter.

7. The laser emitter as defined in claim 1 further comprising isolation means coupled between said first and second laser oscillators and said beam combining means for providing isolation therebetween.

8. The laser emitter as defined in claim 1 further comprising:
   polarization means for polarizing said dual-frequency laser beam; and
   means for detecting said polarization and directing said polarized dual-frequency laser beam to said output means.

9. A controllable dual-frequency laser emitter comprising:
   first laser source means for generating a first laser beam having a first frequency;
   second laser source means for generating a second laser beam having a second frequency;
   beam combining means for combining said first and second laser beams to form a dual-frequency laser beam;
   amplification means coupled to said beam combining means for amplifying said dual-frequency laser beam;
   phase conjugation means coupled to the output of said amplification means for providing phase conjugation to said dual-frequency laser beam;
   frequency doubling means for doubling the frequency of said dual-frequency laser beam; and
   output means for transmitting a laser beam output having controlled frequencies dependent upon said first and second laser beams.

10. The laser emitter as defined in claim 9 further comprising means for controlling at least one of said first and second frequencies.

11. The laser emitter as defined in claim 9 further comprising:
    a variable attenuator coupled to said second laser beam for adjusting the amplitude of said second laser beam.

12. The laser emitter as defined in claim 9 wherein said beam combining means comprises a beam splitter.

13. The laser emitter as defined in claim 9 wherein said first and second laser source means each comprises:
    a master oscillator; and
    a continuous wave (CW) oscillator connected to said master oscillator.

14. A method for producing a dual-frequency laser emission comprising:
    generating a first laser beam having a first frequency;
    generating a second laser beam having a second frequency;
    combining said first and second laser beams to form a dual-frequency laser beam;
    amplifying said dual-frequency laser beam; and
    transmitting an output laser beam having frequencies which are dependent upon said first and second laser beams.

15. The method as defined in claim 14 further comprising the step of doubling the frequency of said dual-frequency laser beam.

16. The method as defined in claim 15 further comprising the step of providing phase conjugation to said dual-frequency laser beam.

17. The method as defined in claim 15 further comprising the step of adjusting the relative amplitude and frequency of said first and second laser beams.

18. The method as defined in claim 14 wherein said step of combining said first and second laser beams comprises:
    splitting said first laser beam to provide a split portion thereof;
    splitting said second laser beam to provide a split portion thereof; and
    combining said split portions of said first and second laser beams to provide said dual-frequency laser beam.

* * * * *